United States Patent [19]

Azukizawa et al.

[11] Patent Number: 4,817,533
[45] Date of Patent: Apr. 4, 1989

[54] TRANSPORTATION SYSTEM OF FLOATED-CARRIER TYPE

[75] Inventors: Teruo Azukizawa; Mimpei Morishita, both of Tokyo, Japan

[73] Assignee: Kabushiki Kaisha Toshiba, Kawasaki, Japan

[21] Appl. No.: 46,464

[22] Filed: May 6, 1987

[30] Foreign Application Priority Data

May 14, 1986 [JP] Japan ............................ 61-109914

[51] Int. Cl.⁴ .................... B60L 13/10; B60M 7/00
[52] U.S. Cl. .................... 104/289; 104/129; 104/284; 104/290; 104/307; 105/50; 320/2
[58] Field of Search .................... 104/48, 128, 129, 249, 104/281–284, 286, 289, 290, 293–296, 302, 303, 307; 105/50; 318/135; 246/122 R, 182 A, 182 B; 191/6, 9, 14; 320/2

[56] References Cited

U.S. PATENT DOCUMENTS

| | | | |
|---|---|---|---|
| 2,486,222 | 10/1949 | Spafford | 104/128 |
| 3,169,733 | 2/1965 | Barrett, Jr. | 105/50 X |
| 3,596,018 | 7/1971 | Elmes | 320/2 X |
| 3,882,789 | 5/1975 | Simon et al. | 104/281 X |
| 3,899,979 | 8/1975 | Godsey, Jr. | 104/284 X |
| 3,937,148 | 2/1976 | Simpson | 104/284 X |
| 3,986,095 | 10/1976 | Nakai et al. | 320/2 |
| 4,158,802 | 6/1979 | Rose, II | 320/2 |
| 4,577,145 | 3/1986 | Mullersman | 320/2 |

FOREIGN PATENT DOCUMENTS

| | | | |
|---|---|---|---|
| 3541094 | 5/1987 | Fed. Rep. of Germany | 104/290 |
| 49-15112 | 2/1974 | Japan . | |
| 60-96106 | 5/1985 | Japan . | |
| 60-160367 | 8/1985 | Japan . | |
| 61-15557 | 1/1986 | Japan . | |
| 61-102105 | 5/1986 | Japan . | |

*Primary Examiner*—Robert B. Reeves
*Assistant Examiner*—Scott H. Werny
*Attorney, Agent, or Firm*—Oblon, Fisher, Spivak, McClelland & Maier

[57] ABSTRACT

A transportation system of a floated-carrier type according to the present invention has a guide rail cover extending in a longitudinal direction. The guide rail cover comprises a guide rail. A carrier is made to float, in a non-contact manner, from the guide rail, by means of floating device and is propelled along the guide rail by a transfer device. An electrical device and a battery for supplying a current thereto are mounted on the carrier. In this transportation system, a charging device is provided for charging the battery. The charging device comprises a first terminal connected to the battery, a charging power source located on the guide rail cover, and a second terminal, which is connected to the charging electric power source and can be brought into contact with the first terminal when the carrier is stopped at a predetermined position. When this occurs, the first and second terminals are brought into contact with each other, and the charging power source supplies power to the battery via the first and second terminals. Each time the carrier is stopped at the predetermined position, the battery can be charged, thereby enabling the carrier to be operated continuously over a long period of time.

12 Claims, 7 Drawing Sheets

TRANSPORTATION SYSTEM OF FLOATED-CARRIER TYPE

BACKGROUND OF THE INVENTION

The present invention relates to a transportation system of a floated-carrier type and, more particularly, to a transportation system of a floated-carrier type wherein, when a carrier is stopped at a station, the carrier's battery can be automatically charged.

With the aim of increasing office or factory automation, such transportation systems have, in recent times, been installed in some buildings. Such systems are used to transport slips, documents, cash, samples, or the like, between a plurality of locations within the buildings.

In order to avoid spoiling the working environment of the offices or factories, it is essential that such transportation systems do not produce dust or an excessive level of noise. Thus, in one such conventional transportation system, described in U.S. patent application Ser. No. 7/036,175, filed on Apr. 8, 1987 by the inventors hereof, a carrier is kept floating, in a non-contact manner, from a guide rail, by means of an electromagnetic attractive force acting between the carrier and the rail, when the carrier is propelled along the rail.

In this transportation system, various types of electrical devices are mounted on a carrier. More specifically, an electromagnet applying an electromagnetic attractive force to the carrier, and a control unit for controlling the magnet are mounted on the carrier. A battery for supplying a current to the magnet and control unit is mounted on the carrier. The battery preferably has a large capacity, so that the carrier can be continuously operated over a long period of time.

However, since a large-capacity battery is quite heavy, then if it is mounted on the carrier, the total weight of the carrier increases considerably. The electrical power required to enable the carrier to float also increases, which represents a considerable waste of energy.

On the other hand, a small-capacity battery is light weight, hence the energy required to enable the carrier to float can be greatly reduced. However, such a battery requires frequent replacement, in order that the carrier can be operated continuously over a long period of time. It requires a long period for replacing the battery, so that a maintenance for replacement is cumbersome. (Note that an apparatus for replacing the battery of the carrier in the transportation system is disclosed in Japanese Patent Disclosure (Kokai) No. 49-15112.)

It is therefore difficult to realize a transportation system wherein a carrier does not waste a large amount of energy, and which can be operated continuously over a long period of time without the need for frequent replacement of its battery.

In addition, if the weight of the carrier increases considerably, the electrical power to accelerate the carrier would be increased. Also, the carrier is magnetically suspended in a non-contact manner, from a guide rail. That is, the guide rail receives the total weight of the carrier. In case the weight of the carrier increases considerably, it is required that the guide rail be rigidly suspended to the ground. Therefore, propelling energy and the cost of ground facilities would be increased.

SUMMARY OF THE INVENTION

It is an object of the present invention to provide a transportation system of a floated-carrier type in which a carrier can be operated continuously over a long period of time without the need to frequently replace the carrier's battery.

A transportation system of a floated-carrier type according to the present invention features a guide rail cover extending in the longitudinal direction. The guide rail cover comprises a guide rail. A carrier is made to float from the guide rail, in a non-contact manner, by means of a floating device, and made to travel along the guide rail, by means of a traveling device. An electrical device and a battery for supplying a current thereto are mounted on the carrier. In this transportation system, a charging device is provided for charging the battery. The charging device comprises a first terminal connected to the battery and provided on the carrier, a charging power source arranged on the guide rail cover, and a second terminal, which is connected to the charging power source and can be brought into contact with the first terminal when the carrier is stopped at a predetermined stop position.

When the carrier is stopped at the predetermined stop position, the first and second terminals are brought into contact with each other, and the charging power source supplies power to the battery through the first and second terminals. Each time the carrier is stopped at the predetermined position, the battery can be charged, and the carrier can then be operated continuously over a long period of time. For this reason, the battery mounted on the carrier can be a small-capacity type. Since the battery need not be frequently replaced, unlike in the conventional system, the maintenance requirements of the transportation system can be greatly reduced.

DETAILED DESCRIPTION OF THE PREFERRED EMBODIMENTS

Figure 1:
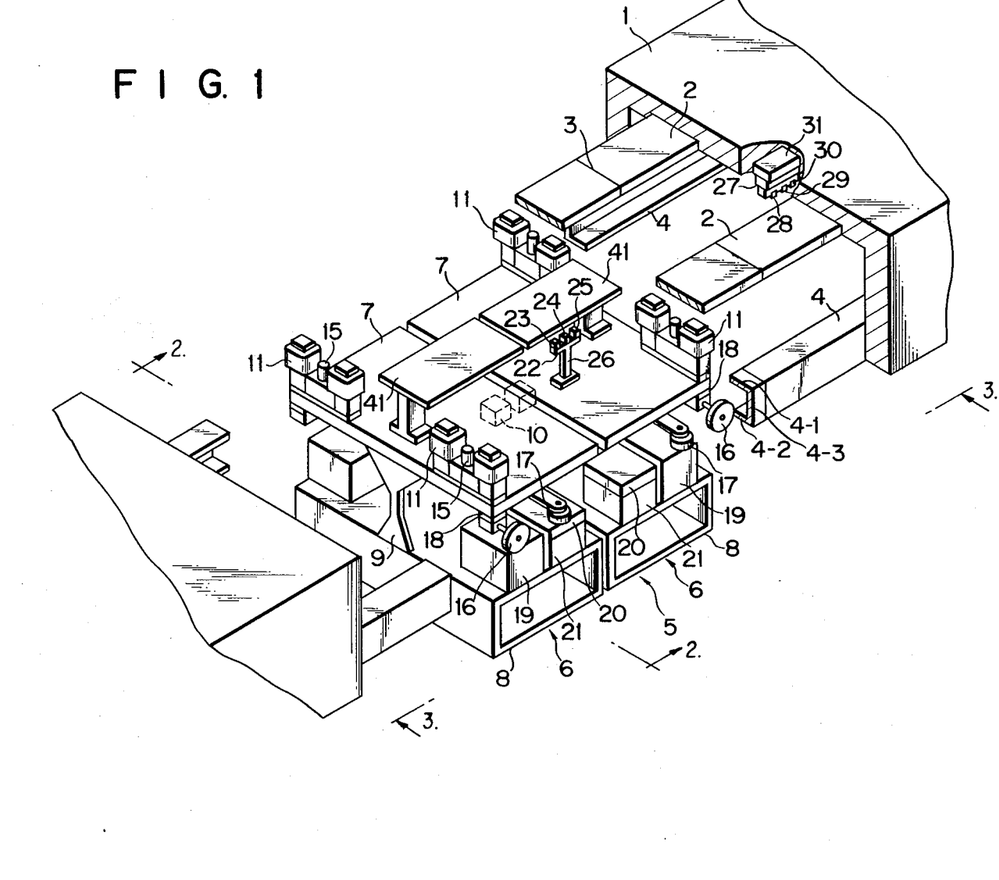
FIG. 1 is a perspective view of a transportation system of a floated-carrier type according to an embodiment of the present invention.

As is shown in FIG. 1, in a transportation system of a floated carrier type, guide rail cover 1 having an inverted U-shaped section extends in the longitudinal direction. A pair of guide rails 2 are arranged under the upper wall of guide rail cover 1, and extend in the longitudinal direction, parallel to each other. Guide rails 2 are formed of a plurality of planar members composed of a ferromagnetic material. The planar members are connected in the longitudinal direction. More specifically, the planar members are bonded to each other at bonding surfaces 3. A pair of sub-guide rails 4 having a U-shaped section are arranged on the two side walls of guide rail cover 1. The function of sub-guide rails 4 will be described later.

Carrier 5 travels along guide rails 2. Carrier 5 is constituted by a pair of bodies 6, each of which comprises supporting plate 7 facing the lower surface of guide rail 2, and carrier box 8 suspended from supporting plate 7 by means of coupling member 9. A pair of supporting plates 7 are coupled in the longitudinal direction by coupler 10. A pair of bodies 6 can be rolled around the coupler, as axis of rotation.

Figure 2:
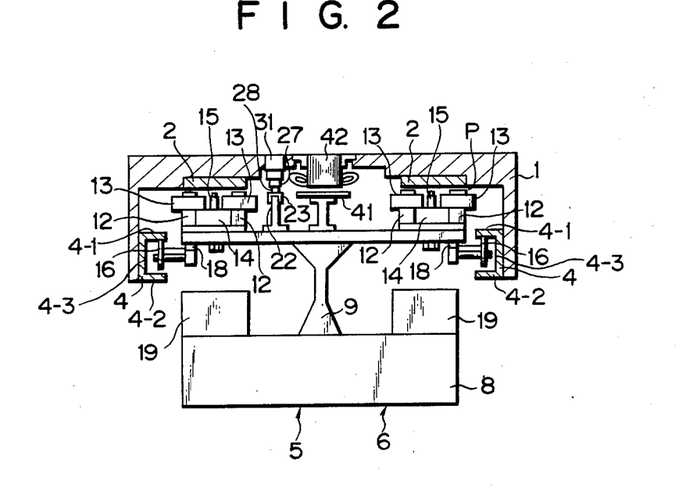
FIG. 2 is a sectional view taken along the line 2—2 in a transverse direction of the transportation system shown in FIG. 1.

Carrier 5 is made to float, in a non-contact manner, from guide rails 2 by magnetic units 11. A pair of magnetic units 11 are arranged on each of the two plates 7; one pair on a front corner portion of one plate 7, the other pair on a rear corner portion of the other plate 7. As is shown in FIG. 2, each magnetic unit 11 is provided with yokes 12, facing guide rail 2. Conducting wires are wound around yokes 12, thereby forming coils 13. Air gap P is defined between the top face of each yoke and the lower surface of rail 2. Permanent magnet 14 is used to couple yokes 12 magnetically. Thus, permanent magnet 14, yokes 12, gaps P, and rail 2 constitute a magnetic circuit. Each magnetic unit is further provided with gap sensor 15 for detecting the amount of clearance of gap P.

As is shown in FIGS. 1 and 2, a pair of reaction plates 41 are located in the center of the upper surface of each rectangular plate 7, so as to face stators 42 of linear induction motors, stators 42 being located under the guide rail cover. When stators 16 are energized, carrier 5 receives a propelling force. Conversely, if stators 42 are energized, so as to generate the traveling field, in the direction opposite to the propelling direction, carrier 5 is braked and stopped.

Piezoelectric elements 18 are arranged on two front sides of one supporting plate 7. Piezoelectric elements 18 rotatably support first wheels 16, as do the piezoelectric elements 18 arranged on two rear sides of the other rectangular plate 7. First wheels 16 are brought into contact with upper walls 4-1 of sub-guide rails 4 when carrier 5 is stopped and moved upward. Thus, sub-guide rails 4 stabilize carrier 5. When the electromagnetic attractive force acting between the magnetic unit and the rail, decreases, for example, in an emergency, first wheels 16 make contact with lower walls 4-2 of sub-guide rails 4, so that carrier 5 is supported by sub-guide rails 4 and can not be dropped downward. When first wheels 16 are in contact with upper or lower walls 4-1 or 4-2, piezoelectric elements 18 are turned on and generate a detection signal, indicating that carrier 5 has stopped traveling and has been moved upward, or that carrier 5 has been made to stop floating.

Second wheels 17 are arranged on two side portions of each supporting plate 7. Second wheels 17 are brought into contact with inner walls 4-3 of sub-guide rails 4 when carrier 5 yaws during its traveling.

Each carrier box 8 is equipped with control unit 19 for controlling magnetic units 11. Carrier box 8 is equipped with constant voltage regulator 20 for applying a predetermined voltage to control unit 19 and magnetic units 11, and is also equipped with battery 21 for supplying a current to constant voltage regulator 20. Constant voltage regulator 20 eliminates any adverse influence of a voltage drop on control unit 19 caused by variations in load.

Accordingly, carrier 5 is suspended from guide rails 2, in a non-contact manner, by means of a magnetic attractive force acting between magnetic units 11 and guide rail 2. In this embodiment, units 11 are controlled by so called zero-power control device, so that the minimum electric current necessary is supplied to coils 13 when carrier 5 is made to float. In other words, four permanent magnets 14 always generate an attractive force equal to the total weight of carrier 5 and the load. At the same time, coils 13 are excited, so as to maintain the air gap clearances by means of which the attractive forces between permanent magnets and rails balance with the total weight of the carrier itself and the load. Coils 13 serve to subordinately cause carrier 5 to float. If the total weight of carrier 5 is changed by the load, the current fed to coils 13 is controlled so that gap P is adjusted to a distance such that the total attractive force between permanent magnets 14 and guide rails 2 balance the total weight of carrier 5 and the load. In other words, by controlling the current fed to the coils, clearance of gap P is adjusted to a value such that carrier 5 is caused to float by means of the magnetic energy of permanent magnet 14 only, despite the existence of disturbances. (The zero-power control device is described in detail in U.S. patent application Ser. No. 7/036,175, filed previously by the inventor hereof.)

The transportation system is equipped with a charging device for charging battery 21 of carrier 5 when carrier 5 is stopped at a predetermined station. More specifically, first terminal 22 is arranged on supporting plate 7 of carrier 5, and second terminal 27 is arranged under the upper wall of guide rail cover 1.

First terminal 22 comprises positive electrode 23, common electrode 24, and negative electrode 25. Electrodes 23 to 25 are supported by support member 26. Electrodes 23 to 25 are connected to the electrodes of battery 21 by means of wiring, as is shown in FIG. 4.

Second terminal 27 is arranged to face first terminal 22 while carrier 5 is stopped at a predetermined stop position. Terminal 27 comprises positive electrode 28, common electrode 29, and negative electrode 30, and is supported by lift 31. When carrier 5 is stopped at a station and is moved upward, second terminal 27 is moved downward by lift 31. Electrodes 28 to 30 of second terminal 27 are brought into contact with corresponding electrodes 23 to 25 of first terminal 22. As is shown in FIG. 4, electrodes 28 to 30 are connected to the electrodes of charging power source 32 by means of wiring.

Figure 3:
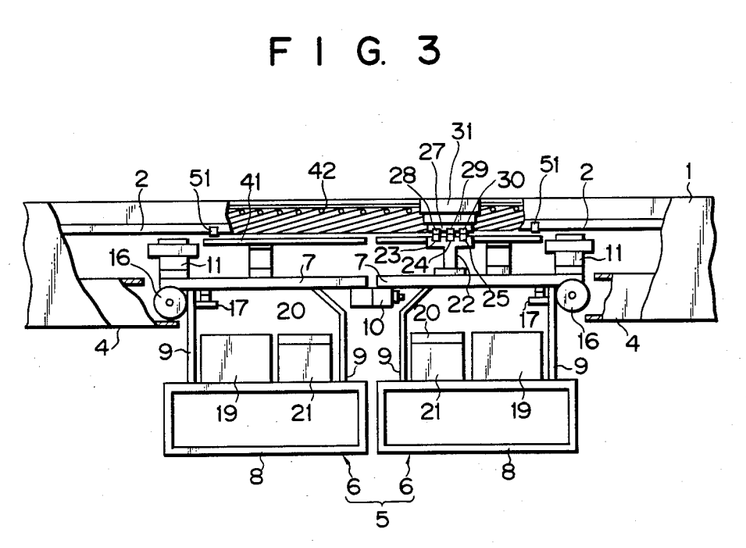
FIG. 3 is a sectional view taken along the line 3—3 in a longitudinal direction of the transportation system shown in FIG. 1.
Figure 4:
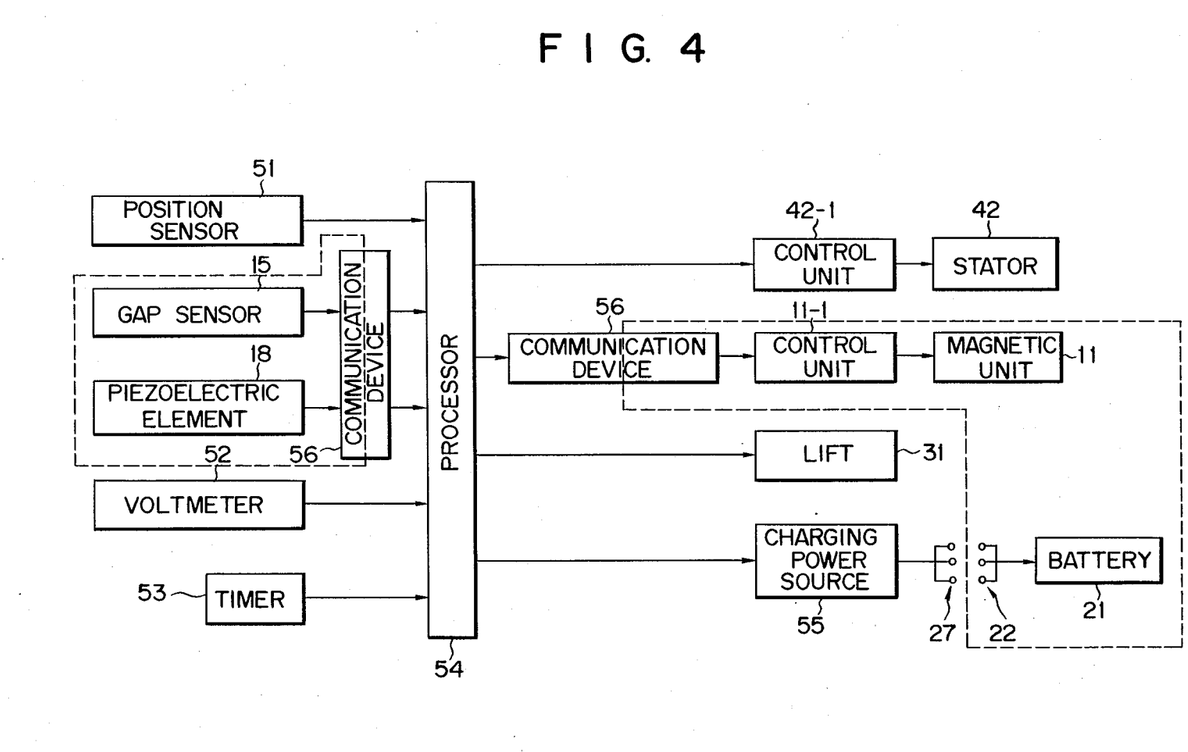
FIG. 4 is a block diagram of a control unit for a charging device according to the present invention.

The charging device is controlled by a controller shown in FIG. 4. Position sensor 51 is arranged under guide rail 1, as is shown in FIG. 3, in order to detect whether or not carrier 5 has stopped at a station. Sensor 51 emits light beam to reaction plate 41, and detects light beam reflected by plate 41, so as to detect the location of carrier 5. When stopped at the station, carrier 5 is moved upward. Gap sensor 15 or piezoelectric elements 18 detects whether or not carrier 5 has been moved up to a predetermined position. Second terminal 27 is moved downward by lift 31. Voltmeter 52 detects a voltage across the electrodes of second terminal 27 in order to confirm whether or not first and second terminals 22 and 27 have been brought into contact with each other. When the first and second terminals are in proper contact with each other, the charging of battery 21 is begun. Timer 53 counts the charging time in order to detect whether or not the charging of battery 21 has been completed. The detected signals are introduced to processor 54, which processes these detected signals, and issues a command to control unit 42-1 of stator 42, control unit 11-1 of magnetic unit 11, lift 31, and charging power source 55. Note that processor 54 is installed on the ground, and components enclosed by dotted lines in FIG. 4, are mounted on carrier 5, so that the detection signals of gap sensor 15 and piezoelectric element 18, are input to processor 54, by way of light communication, i.e., communication device 56. Similarly, by way of communication device 56, the command issued from processor 54 are introduced to control unit 11-1 of magnetic unit 11.

Figure 5:
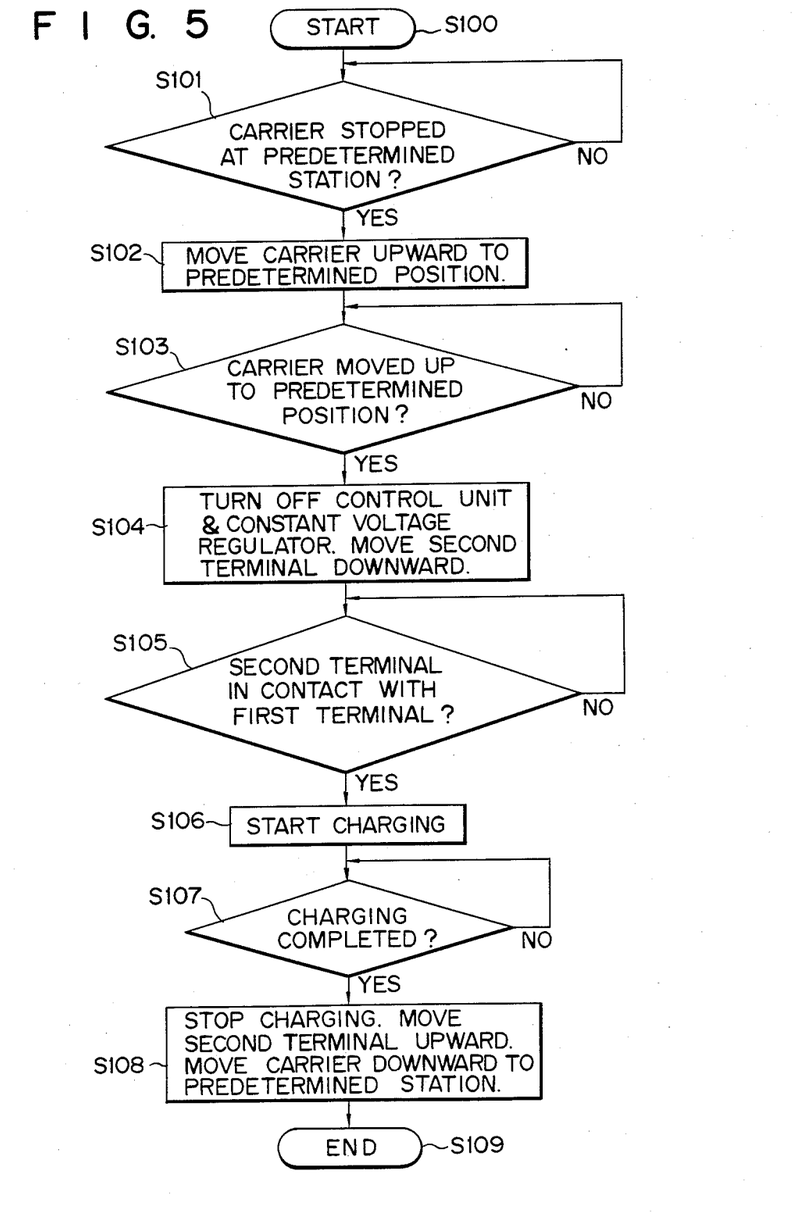
FIG. 5 is a flow chart showing the steps involved when a carrier's battery is charged.

The steps involved in charging battery 21 of carrier 5, by means of the above-noted charging device, will now be described, with reference to the flow chart shown in FIG. 5.

When carrier 5 reaches a predetermined station, a check is performed, in step 101, to inspect whether all the optical sensors 51 are off. If any of sensors 51 is found to be on, stators 42 are energized to apply a braking force to the carrier 5 which is running, so that the carrier is decelerated. If the two sensors are both found to be on at the same time for a while, it is concluded that carrier 5 has reached the predetermined station. Stators 42 then cease being energized, so that the carrier is stopped.

When carrier 5 is positioned at the predetermined station, in this manner, it is then moved upward by a predetermined distance, in step 102. More specifically, the coils of magnetic unit 11 are energized at a polarity which emphasizes the magnetomotive force of permanent magnet 14, thereby moving carrier 5 upward. In step 103, a check is performed to inspect whether carrier 5 has been moved up to a predetermined position. More specifically, when gap sensor 15 detects that the gap clearance between guide rails 2 and yokes 12 has reached a predetermined value, a detected signal from gap sensor 15 is introduced to processor 54. Thus, control unit 11-1 ceases to supply current to coil 13, so that upward movement of carrier 5 is stopped. At this time, first wheels 16 are brought into contact with upper walls 4-1 of sub-guide rails 4. Piezoelectric elements 18 supporting first wheels 16 receive a force from upper walls 4-1, and produce an electrical signal, whereby control unit 19 may cease to supply current to coil 13 and the upward movement of carrier 5 can be stopped. At this time, since first wheels 16 are brought into contact with upper walls 4-1 of sub-guide rails 4, carrier 5 is supported by sub-guide rails 4.

In step 104, after control unit 19 and constant voltage regulator 20 are turned off, second terminal 27 is moved downward by lift 31, whereby the charging time is shortened. In step 105, a check is performed to inspect if second terminal 27 is in proper contact with first terminal 22. More specifically, a voltage across electrodes 28 to 30 is measured by voltmeter 52, and a measured signal is introduced to processor 54. If the voltage is at a predetermined value, it is confirmed that electrodes 23 to 25 of first terminal 22 are in proper contact with electrodes 28 to 30 of second terminal 27.

In step 106, when second terminal 27 is in proper contact with first terminal 22, charging power source 55 begins to supply power to battery 21 of carrier 5. At the same time, timer 53 is set. In step 107, a check is performed to inspect if charging has been completed. More specifically, if battery 21 has been continuously charged for a predetermined period of time, it is confirmed that charging is completed. In other words, it is checked if timer 53 has counted a predetermined period of time.

When charging is confirmed as being completed, the charging process is ended, in step 108. Specifically, charging power source 55 is turned off. Second terminal 27 is moved upward by lift 31. Since power source 55 is turned off before terminal 27 is moved upward, an arc across first and second terminals 22 and 27 can be prevented. Carrier 5 has been moved downward by magnetic units 11. Gap sensor 15 detects that carrier 5 is moved downward to a predetermined position for traveling. The detected signal from sensor 15 is introduced to a main processor (not shown). Carrier 5 waits by until it receives a travel-start command from the main processor.

According to the above-mentioned flow chart, when carrier 5 is stopped at the station, it is then moved upward. However, carrier 5 need not always be moved upward. Second terminal 27 is moved downward by lift 31. For this reason, when carrier 5 is maintained at a level capable of traveling, or when carrier 5 is made to stop floating and is supported by sub-guide rails 4, second terminal 27 can be brought into contact with first terminal 22, thereby charging the battery.

According to the present invention, when carrier 5 is stopped at the predetermined station, first and second terminals 22 and 27 are automatically brought into contact with each other, and the battery is charged. Each time carrier 5 is stopped at a predetermined position, the battery can be charged, thereby enabling carrier 5 to be operated continuously over a long period of time. Since the battery mounted on carrier 5 can be a small-capacity type, the amount of energy required to enable carrier 5 to float can be reduced. Since the battery does not need to be frequently replaced, as in the case of the conventional system, the maintenance requirements of the transportation system can be greatly simplified.

Figure 6:
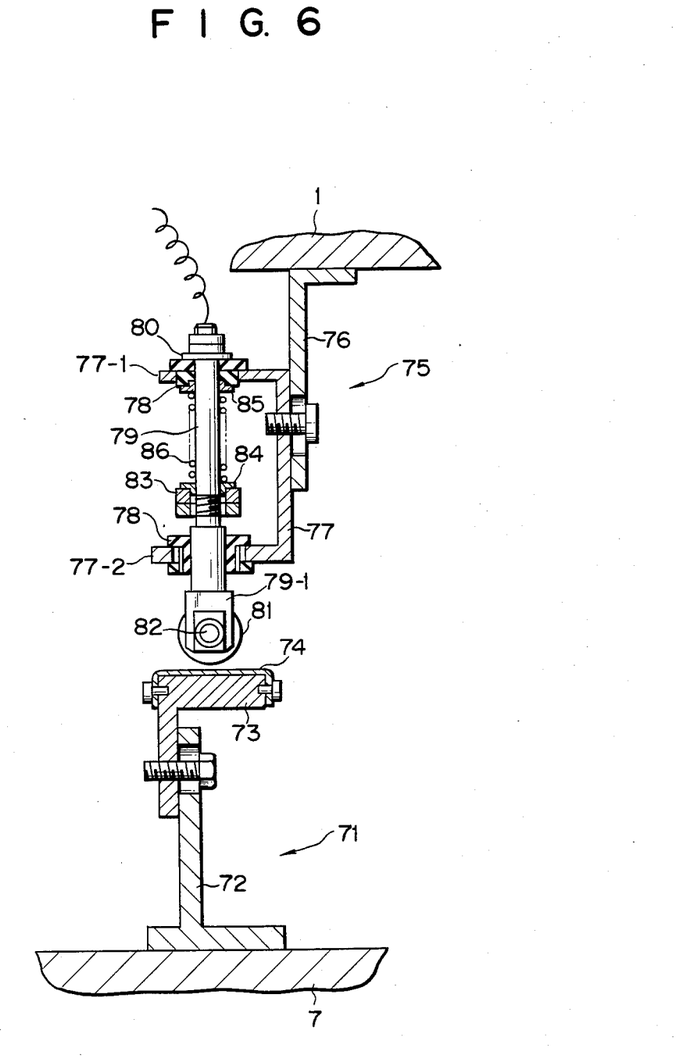
FIG. 6 is a sectional view showing a modification of a power supply terminal included in the charging device of the present invention.

The electrodes of the first and second terminals of the charging device of the present invention, can be electrodes, as shown in FIG. 6. Specifically, first terminal 71 is formed on supporting plate 7 of a carrier. In first terminal 71, support member 72, fixed on plate 7, extends upward. L-shaped insulating member 73 is fixed on the upper end of support member 72. A bolt is inserted through an elongated hole formed on the upper end of support member 72, and is threadably engaged with the proximal end of member 73. Therefore, since the elongated hole extends in the vertical direction, the height of member 73 can be adjusted in the vertical direction. Flat electrode 74 is located on the distal end of L-shaped member 73.

Second terminal 75 is formed under guide rail cover 1. In second terminal 75, support member 76, fixed under guide rail cover 1, extends downward. U-shaped member 77 is fixed to the lower end of support member 76. Cylindrical members 78, having an insulating property, are arranged on upper and lower walls 77-1 and 77-2 of member 77. Conductive columnar shaft 79 extends through each cylindrical member 78, so as to be movable in the vertical direction. Flange 80, for supporting shaft 79, is formed on the upper end of shaft 79. The upper end of shaft 79 is connected to the charging power source by means of wiring. Fork portion 79-1 is formed on the lower end of shaft 79. Disk-like electrode 81 is rotatably supported by fork member 79-1 via shaft 82.

Two nuts 83 are threadably engaged with the intermediate portion of shaft 79. Washer 84 is arranged on these nuts 83, and washer 85 is arranged below upper cylindrical member 78. Spring 86 is interposed between washers 84 and 85. When first terminal 71 is moved upward thereby, and electrode 74 is brought into contact with electrode 81 of second terminal 75, shaft 79 is moved upward. However, a force acting on shaft 79 is absorbed by a biasing force of spring 86. Thus, an excessive force is not applied to electrodes 74 and 81.

When cylindrical member 78 or nut 83 comprises a pressure sensor, it can be detected whether or not first and second terminals 71 and 75 are in contact with each other. When a microswitch is adopted to be turned on/off upon deviation of shaft 79 relative to member 77, it can similarly be detected whether or not first and second terminals 71 and 75 are in contact with each other.

A second embodiment of the present invention will now be described.

In this embodiment, two tracks are arranged at different levels. In addition, a device is provided, in this embodiment, for moving a carrier from an upper to lower track and vice versa. As is shown, in more detail, in FIG. 7, station or lift 112, which is movable in the vertical direction, is arranged between the end portions of lower and upper tracks 110 and 111.

Figure 7:
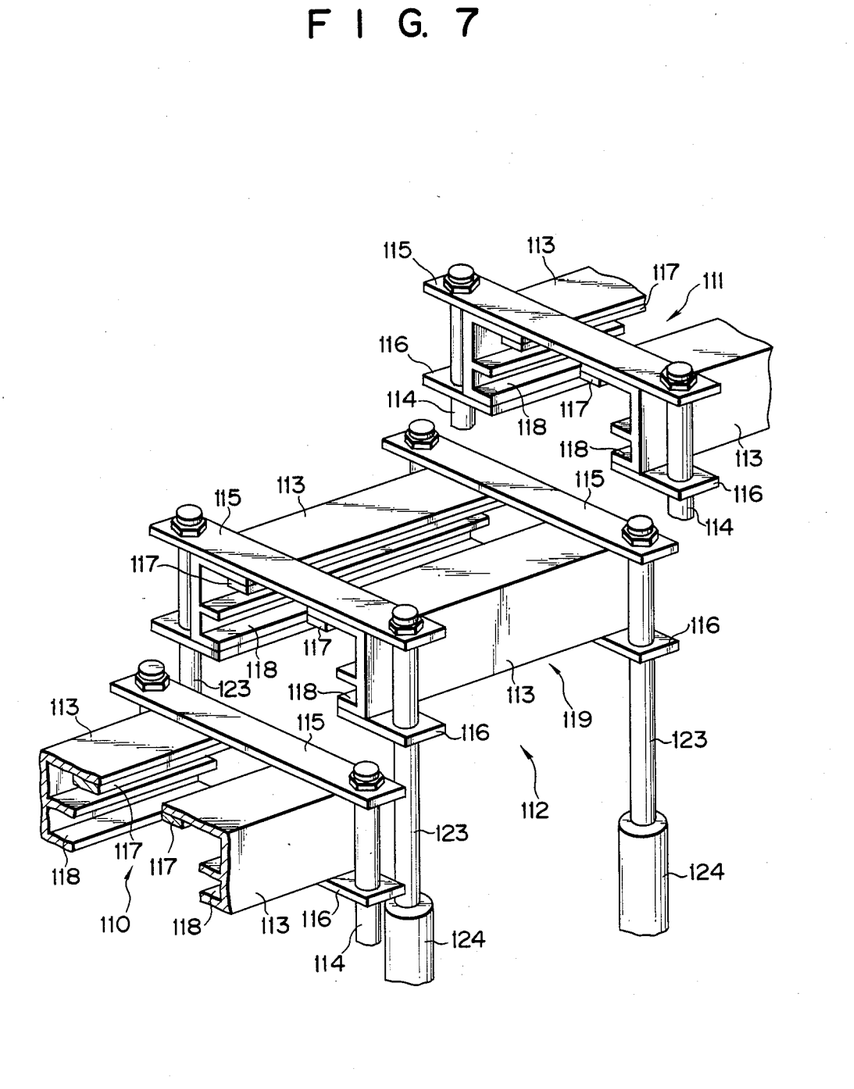
FIGS. 7 and 8 are perspective views showing a transportation system according to a second embodiment of the present invention, in which two tracks are arranged on different levels.

A pair of guide rail covers 113 having an E-shaped cross-section, are arranged on tracks 110 and 111. Upper end portions of a pair of stanchions 114, which extend vertically, are coupled by support member 115. Support member 116 is arranged at a predetermined level of each stanchion 114. The end portions of guide rail covers 113 are supported on stanchions 114 by means of support members 115 and 116. A pair of guide rails 117 are arranged under the upper walls of guide rail covers 113. Sub-guide rails 118 are defined by the middle and upper walls of guide rail covers 113.

Lift 112 for lifting the carrier has track 119 having the same arrangement as that of tracks 110 and 111. More specifically, the guide rail covers of track 119 have the same arrangement as that of guide rail covers 113 of tracks 110 and 111. Two end portions of guide rail covers 113 are supported on four stanchions 123 by means of support members 115 and 116. Four stanchions 123 are coupled to hydraulic cylinders 124. Stanchions 123 are moved upward and downward by hydraulic cylinders 124, and track 119 can be moved upward or downward.

When the guide rails of lift 112 are maintained at substantially the same level as those of track 111, the carrier is moved from track 111 to lift 112. In the lift, the carrier is moved downward, together with the guide rails, by the hydraulic cylinders, and the guide rails of the lift are maintained at substantially the same level as those of lower track 110. The carrier is moved from the lift to the lower track.

According to the present invention, when the carrier is stopped in the lift, the battery of the carrier is charged. Stated more precisely, the lift is equipped with a second terminal (not shown), i.e., a power supply terminal. While the carrier is moved upward or downward, its battery can be charged; thus, the time spent lifting the carrier can be utilized effectively.

Figure 8:
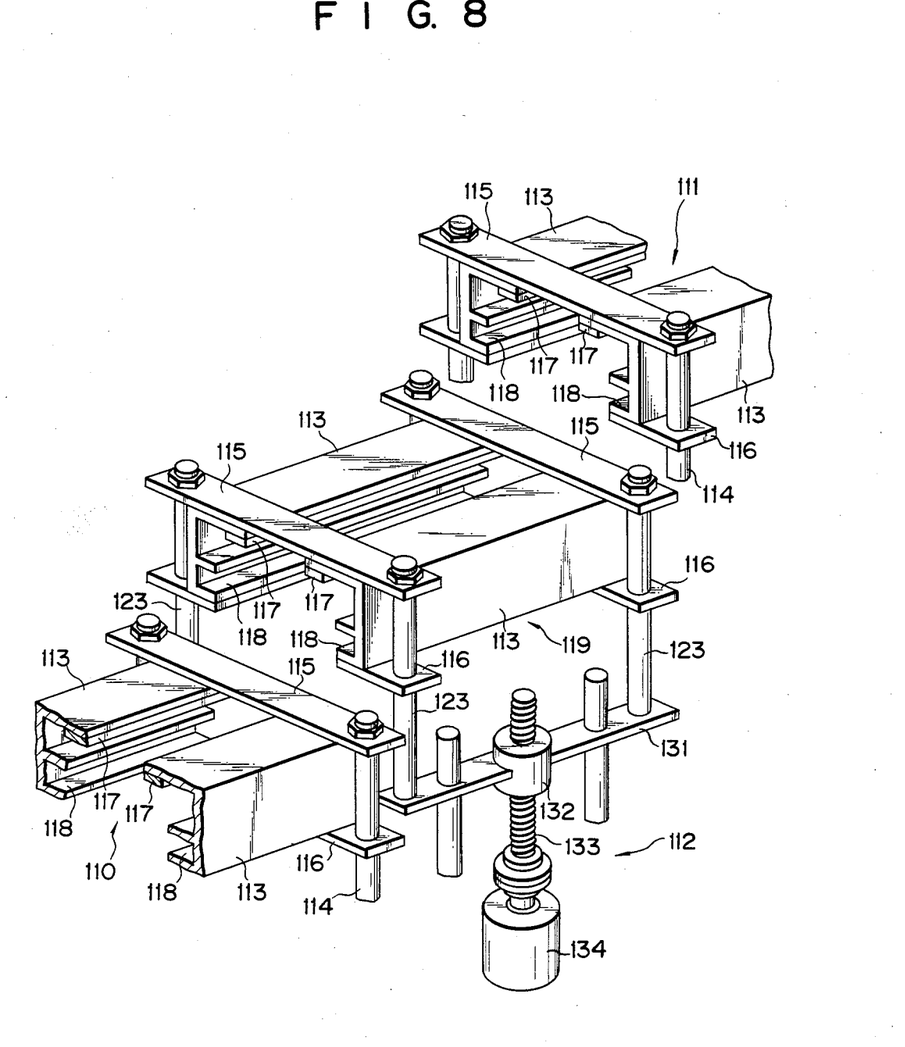

FIG. 8 shows another means for lifting stanchions 123 of the lift. In this modification, the lower end portion of each stanchion 123 is supported by planar member 131. Ball nut 132 is arranged on the intermediate portion of planar member 131. Ball nut 132 is engaged with ball screw 133, which is, in turn, coupled to motor 134. When motor 134 is driven, ball screw 133 is rotated, and stanchions 123 are moved upward or downward. Thus, the track of the lift can be moved upward or downward.

What is claimed is:

1. A transportation system of floated-carrier type, comprising:
    a stationary portion;
    guide rails mounted on the stationary portion and extending in a longitudinal direction;
    a carrier for carrying cargo;
    a floating device for causing said carrier to float from said guide rails, in a non-contact manner;
    transfer means for causing said carrier to travel along said guide rails;
    a battery, mounted on said carrier; and
    a charging device having a first terminal arranged on the carrier and connected to said battery, a charging power source arranged on said stationary portion, and a second terminal arranged on said stationary portion, connected to said charging power source, and capable of contacting said first terminal when said carrier is stopped at a predetermined position, whereby when said carrier is moved up to the predetermined position, said first and second terminals are brought into contact with each other, and said charging power source supplies power to said battery via said first and second terminals;
    wherein when said carrier is stopped at the predetermined position by said transfer means, and is moved up a predetermined distance by said floating device, said second terminal is brought into contact with said first terminal.

2. The transportation system according to claim 1, wherein said guide rails are formed of a ferromagnetic material, and said floating device comprises a magnetic unit mounted on said carrier, said magnetic unit comprising magnets arranged to face lower surfaces of said guide rails and separate therefrom through a gap.

3. The transportation system according to claim 2, wherein said magnetic unit is composed of permanent magnets capable of providing magnetic energy, with which the carrier can be kept floating against the weight thereof and the load thereon, and electromagnets adapted to be excited so as to maintain an air gap clearance by means of which the magnetic attractive force acting between the permanent magnets and the ferromagnetic guide rail balances with the total weight of the carrier itself and the load, regardless of the weight of the load.

4. The transportation system according to claim 2, wherein said transfer means comprises a stator of a linear induction motor, and a reaction plate arranged on said carrier and receiving a propelling force from said stator.

5. The transportation system according to claim 4, wherein said stationary portion includes a lift for moving said second terminal upward/downward and wherein said charging device includes:
    a first sensor, arranged at a predetermined position of said stationary portion, for generating a detection signal when said carrier is stopped at the predetermined position;
    a second sensor, arranged on said carrier, for measuring a gap clearance between said magnetic unit and said guide rail;

a voltmeter for measuring a voltage at said second terminal, in order to detect that said first and second terminals have been brought into proper contact with each other, and a processor for receiving signals from said first and second sensors and said voltmeter, and sending a command to said stator, said magnetic unit, said charging power source, and said lift.

6. The transportation system according to claim 1, wherein said stationary portion comprises a lift for moving said second terminal upward/downward.

7. The transportation system according to claim 6, wherein when said carrier is stopped at the predetermined position by said transfer means, and is moved up a predetermined distance by said floating device, said second terminal is moved downward by said lift, and is brought into contact with said first terminal.

8. The transportation system according to claim 6, wherein when said carrier is stopped at the predetermined position by said transfer means, said second terminal is moved downward by said lift, and is brought into contact with said first terminal.

9. The transportation system according to claim 1, wherein said stationary portion includes sub-guide rails extending in the longitudinal direction, and said carrier includes wheels which are brought into contact with said sub-guide rails when said carrier is stopped at the predetermined position by said transfer means, and is moved upward the predetermined distance by said floating device.

10. The transportation system according to claim 9, wherein said stationary portion includes a lift for moving said second terminal upward/downward and wherein said charging device includes;

a first sensor, arranged at a predetermined position of said stationary portion, for generating a detection signal when said carrier is stopped at the predetermined position;

piezoelectric elements for supporting said wheels and generating an electrical signal when said wheels are brought into contact with said sub-guide rails;

a voltmeter for measuring a voltage at said second terminal, in order to detect that said first and second terminals have been brought into proper contact with each other; and a processor for receiving signals from said piezoelectric elements and said voltmeter, and sending a command to said stator, said magnetic unit, said charging power source, and said lift.

11. The transportation system according to claim 1, wherein said second terminal includes a shaft which is movable in the vertical direction of said guide rail, an electrode arranged on said shaft, and biasing means for biasing said shaft toward said first terminal.

12. The transportation system according to claim 1, wherein said stationary portion includes: two tracks arranged at different levels; and a movable track, movable in the vertical direction, for moving said carrier from one track to the other track, and said second terminal is arranged on said movable track, whereby when said carrier is held on said movable track, said first and second terminals are brought into contact with each other, and said battery is charged.

* * * * *